May 13, 1952
G. F. P. REICH
2,596,174
OIL SEAL
Filed Jan. 14, 1949
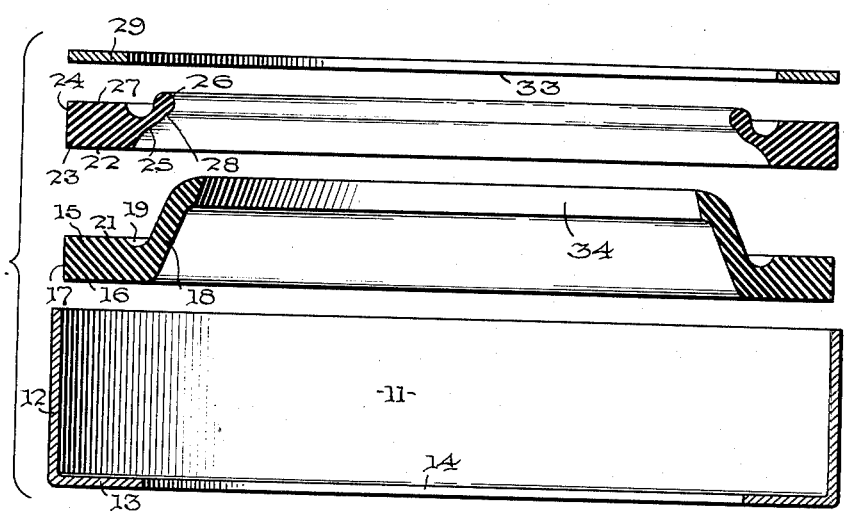
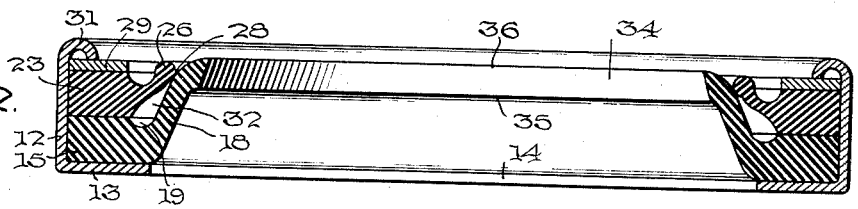
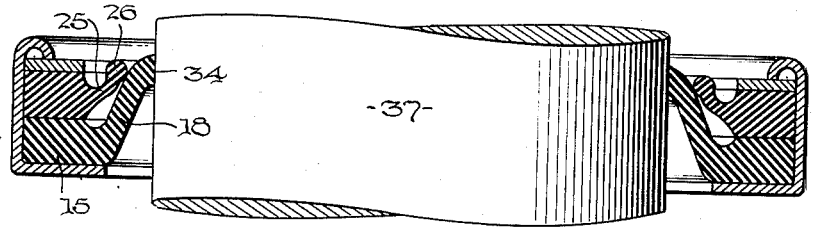
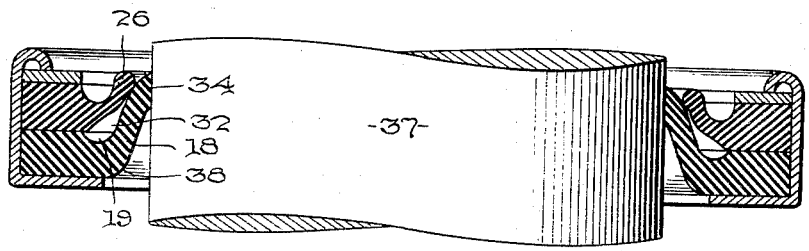
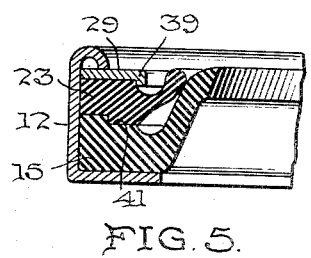
INVENTOR.
GEORGE F. P. REICH
BY
ATTORNEY Patented May 13, 1952

2,596,174

UNITED STATES PATENT OFFICE 2,596,174

OIL SEAL

George F. P. Reich, Bremerton, Wash.

Application January 14, 1949, Serial No. 71,003

4 Claims. (Cl. 288—3)

(Granted under the act of March 3, 1883, as amended April 30, 1928; 370 O. G. 757)

This invention relates to oil seals for insertion between relatively rotating machine parts to prevent leakage of oil and is an improvement upon the oil seal disclosed in my Patent No. 2,476,324, granted July 19, 1949.

Leakage of oil around relatively rotating parts, as between a shaft and its housing, has long been a problem. This problem has become more acute with the development of systems utilizing oil under pressure. The best oil seals heretofore developed have provided a rubber seal surrounding the shaft with a pressure member around the seal arranged so oil pressure would move the pressure member as a lever to compress the seal more tightly about the shaft. These seals have been effective, at least when first installed, to prevent leakage of oil about the shaft. However, as the oil pressure increases, the frictional drag of the seal on the shaft also increases, in some cases to a prohibitive extent. Particularly where shafts are driven at high speeds, the high pressure of the oil seal has caused excessive wear on the shaft. Thus, the rubber-like composition of the seal has been compressed to the point where it becomes an abrasive which cuts into the metal shaft. This results in excessive wear on the shaft and, before too long, permits oil to leak between the seal and the worn part of the shaft.

A major object of this invention is to provide an oil seal which will retain oil under pressure without unduly increasing frictional drag on the rotating parts or causing excessive wear of the parts.

It is an important object of the invention to provide an oil seal which is effective to prevent leakage between relatively rotating machine parts under a wide range of temperature and pressure conditions of the oil and at high speeds of revolution.

More specifically, an object of the invention is to provide an oil seal which will retain oil under pressure without excessively compressing the seal against one of the rotating parts as the pressure of the oil increases.

In accordance with these objects, one feature of the invention resides in the provision of a thin sealing lip for engaging the relatively rotating part, such as the shaft, with a tension band or ring held in position to surround the lip and retain it snugly about the shaft. Oil pressure acting on the tension ring produces a telescoping action moving the ring in a direction to compress the lip about the shaft, but the same pressure is transmitted to the lip also causing a telescoping action of the lip along the shaft, causing it to move along the shaft so it is retained in oil-tight relation to the shaft without substantially increasing the pressure on the shaft. Another feature of the invention resides in the provision of an annular chamber around the sealing lip for receiving oil which responds to oil pressure to produce an equalizing action which telescopes the lip along the shaft. The telescoping action tends to reduce the diameter of the opening in the seal surrounding the rotary shaft and, hence, increases the effect of the seal. However, this is not accomplished by a compressive force on the sealing lip but is accomplished by a distortion of the lip itself.

Other objects and advantages of the invention will become apparent from the following specification taken in connection with the accompanying drawing wherein Figure 1 is an exploded view showing in cross-section individual parts of a preferred embodiment of this invention;

Fig. 2 is a cross-section of an assembled oil seal embodying the invention in its preferred form;

Fig. 3 is a view similar to Fig. 2, but showing the oil seal in position about a shaft;

Fig. 4 is similar to Fig. 3, but showing the distorted position of elements of the seal when acted upon by oil pressure; and Fig. 5 is a partial sectional view of a modified form of oil seal embodying the invention.

Generally, the invention contemplates an oil seal having an annular casing provided with an outer peripheral wall having at its ends radially extending side walls. One of the side walls may be joined to the peripheral wall and the other may be a cover wall secured in position by the peripheral wall. The walls of the casing form a channel holding two axially alined annular members of rubber-like material, a sealing member and a tension member. Integrally formed with the sealing member, preferably adjacent the face of that member which engages one of the side walls, is a frusto-conical sealing lip, thinner than the sealing member, and extending axially toward and beyond the tensioning member. This sealing member has its outer end formed with a sealing surface inclined at a small angle with respect to the axis of the sealing member so the lip will be slightly distorted when a shaft is inserted through the opening in the lip. A frusto-conical flange is formed integrally with the tension member and is arranged concentrically with and axially spaced throughout its length from the lip on the sealing member to provide an annular chamber between the lip and the flange. The flange is thinner than the tension member and has, at its free end, an enlarged bead provided with a rounded surface engaging the lip near its free end. The diameter of the sealing surface is made slightly smaller than the diameter of the shaft it is to surround. When the shaft is inserted, both the lip and the flange are distorted radially outwardly so the bead provides a tension ring holding the free end of the lip with its sealing surface in a liquid-tight engagement with the shaft. Oil pressure acting on the seal will leak between the bead and the lip to fill the annular chamber surrounding the lip. In operation, when the oil pressure increases, it acts on the flange to distort it toward the lip and thereby cause a telescoping movement of the bead along the lip. The oil in the chamber transmits pressure to the lip causing a similar distortion of the lip and a similar telescoping movement of the lip along the shaft. So, the pressure of the tension ring or bead on the sealing lip is increased only by its tendency to constrict due to distortion of the flange. Therefore, the sealing lip is not excessively compressed by the increased oil pressure, but its own distortion tightens it about the shaft.

For a more detailed description of an embodiment of the invention, reference may be had to the accompanying drawing where, in Figure 1, there is shown an annular casing 11 having a peripheral wall 12 with a base or side wall 13 extending radially inwardly from the peripheral wall 12 and provided with an opening 14 somewhat larger in diameter than the shaft to be accommodated. An annular sealing member 15 is arranged to be inserted in the casing 11 so its bottom face 16 will rest on the side wall 13 and its outer peripheral face 17 will contact peripheral wall 12 of the casing. Sealing member 15 has integrally formed therewith a frusto-conical sealing lip 18 preferably joining sealing member 15 adjacent its bottom face 16 and spaced from upper face 21 on sealing member 15. Sealing lip 18 is made thinner than the sealing member to form a groove 19 adjacent upper face 21 of the sealing member 15. Adapted to have its bottom face 22 rest on upper face 21 of the sealing member 15 is an annular tension member 23 having an outer diameter such that its peripheral surface 24 will contact peripheral wall 12 of the casing 11. Integrally formed with the tension member 23 is a relatively thin, frusto-conical flange 25 having somewhat less slope than the slope of frusto-conical lip 18. The juncture of flange 25 with the tension member 23 is axially spaced from contiguous faces 21 and 22 on the sealing ring 15 and tension member 23, respectively. Thus, the juncture of the flange 25 with the tension member 23 is axially spaced from the juncture of the lip 18 with the sealing member 15. The free end of the flange 25 is provided with a bead 26 thicker than the flange and preferably extending slightly above upper surface 27 of the tension member. Bead 26 has on its inner periphery a rounded surface 28 for engaging the outer periphery of the sealing lip 18. To retain the parts in assembled relation as shown in Fig. 2, another side wall or cover wall 29 rests on outer surface 27 of the tension member 23, and is retained to hold the sealing and tension members snugly positioned in the channel formed by peripheral wall 12 and side walls 13 and 29 by turning down the upper end of peripheral wall 12, as shown at 31 in Fig. 2.

With the parts assembled as shown in Fig. 2, the sealing lip 18 extends axially from side wall 13 toward side wall 29 and terminates near the axial location of the side wall 29. The frusto-conical flange 25 on the tension member 23 is spaced substantially throughout its length from the frusto-conical lip 18 on the sealing member 15 to form an annular chamber 32 surrounding the lip 18 and communicating with the groove 19. This chamber is closed by contact of rounded surface 28 with the outer periphery of sealing lip 18 adjacent the free end of the sealing lip. Opening 14 in the side wall 13 and opening 33 in side wall 29 are both larger than the diameter of the shaft to be accommodated. Sealing lip 18 has its free end formed with a sealing surface 34 inclined slightly with respect to the axis of the oil seal. Thus, the sealing surface 34 is of frusto-conical formation having its base 35 of approximately the diameter of the shaft to be accommodated and its smaller opening 36 of less diameter. When a shaft, such as shaft 37 shown in Fig. 3, is inserted through the openings 36 it slightly distorts sealing lip 18 so the sealing surface 34 assumes a cylindrical formation and the entire surface engages the shaft. This distortion of the sealing lip 18 forces the lip radially outwardly against bead 26 thereby slightly distorting flange 25 so the bead 26 provides a tension ring or band surrounding the sealing lip 18 opposite its sealing surface 34 and retaining that surface in liquid-tight contact with the shaft 37.

When the oil seal is now subjected to oil under pressure, oil will seep between rounded surface 28 of the bead 26 and the outer periphery of sealing lip 18 into annular chamber 32 and groove 19. Also, the pressure of the oil will act on flange 25 tending to force it axially toward the sealing member 15 which would result in compression of the sealing lip 18 toward the shaft 37. However, the oil in chamber 32 and groove 19 is subjected to the same pressure by the flange 25 so it distorts sealing lip 18 to also move the sealing lip axially of the shaft 37. Thus, the telescoping of bead 26 slightly increases its tension tending to constrict the sealing surface 34 about the shaft 37, but this pressure is not excessive, because the sealing lip itself telescopes along the shaft 37, as the lip 18 is distorted, as indicated at 38 in Fig. 4. This distortion of the lip 18 tends to reduce the diameter of the sealing surface 34 and thereby constricts it about the shaft 37 to maintain liquid-tight contact between sealing surface 34 and the shaft.

This telescoping action is facilitated by the lubricating effect of the oil between the bead 26 and the sealing lip 18. While there is sufficient pressure on the sealing lip to maintain an oil-tight seal, this pressure is not sufficient to cause excessive friction or wear on the shaft.

The annular sealing and tension members 15 and 23, together with the integrally formed lip 18 and flange 25 with its bead 26, are made of a suitable elastomeric material. In this specification, and in the claims, these members are referred to as rubber-like. By "rubber-like" is intended a natural rubber or a synthetic composition having the characteristics of rubber but which is oil-resistant. It has been found particularly advantageous to utilize a synthetic oil-resistant rubber composition having a butadiene copolymer base.

In some cases, depending upon the dimensions of the seal, it is desirable to interlock the sealing and tension members so they are retained in the channel of the casing. For this purpose, cover wall 29 of the casing may be provided with an inturned flange 39 engaging the inner periphery of the tension member 23. Also, the adjoining surfaces of tension member 23 and sealing member 15 are stepped, as indicated at 41, so the sealing member 15 is retained against peripheral wall 12 by the steps 41 and tension member 23 is retained by flange 39 on the cover wall 29.

Where seals in which a pressure ring acts on an annular seal under the pressure of oil have been unsatisfactory, they have been satisfactorily replaced by seals embodying the features of this invention. Oil seals embodying the invention have effectively sealed relatively rotating parts against leakage of oil under pressure under varying conditions of temperature and pressure. They do not cause undue frictional drag on the rotating parts nor do they cause excessive wear of the parts.

The invention described herein may be manufactured and used by or for the Government of the United States of America for governmental purposes without the payment of any royalties thereon or therefor.

What is claimed is:

1. An oil seal comprising a pair of annular rubber-like members retained in axial alignment by a snugly fitting casing, a relatively thin frusto-conical sealing lip integral with one of said members and extending axially toward the other member, an annular tension band surrounding said lip near the free end thereof, and a frusto-conical flange thinner than said tension band and thinner than said sealing lip, said flange being formed of flexible rubber-like material integral with said band and said other member, said lip and said flange being spaced from each other to form an annular chamber between said flange and said lip, said lip and said flange being so proportioned and arranged that a change in pressure distorts said flange to move said band axially in telescoping fashion along said lip.

2. An oil seal as defined in claim 1 wherein said band has a rounded surface contacting said lip.

3. An oil seal as defined in claim 1 wherein the juncture of said flange with said other member is axially spaced from the juncture of said lip with said one member.

4. An oil seal for retaining oil between relatively rotating machine parts comprising an annular casing having a peripheral wall with said walls extending radially from its ends to form a channel; a rubber-like, annular, sealing member in said channel engaging one of said side walls; a rubber-like, annular, tension member in said channel between said sealing member and the other side wall; a relatively thin, frusto-conical lip integral with said sealing member and extending axially toward said other side wall; a relatively thin, frusto-conical flange integral with said tension member, said flange being concentric with and spaced from said lip substantially throughout its length forming an annular chamber between said flange and said lip; and a bead at the end of said flange having a rounded surface in engagement with said lip adjacent said sealing surface forming a tension band around said lip; said flange being thinner than said bead and thinner than said lip, said lip and said flange being so proportioned and arranged that a change in pressure distorts said flange to move said bead axially in telescoping fashion along said lip.

GEORGE F. P. REICH.

REFERENCES CITED

The following references are of record in the file of this patent:

UNITED STATES PATENTS

| Number | Name | Date |
|---|---|---|
| 1,977,081 | Olsen | Oct. 16, 1934 |
| 2,316,941 | Dodge | Apr. 20, 1943 |
| 2,476,324 | Reich | July 19, 1949 |

FOREIGN PATENTS

| Number | Country | Date |
|---|---|---|
| 799,867 | France | of 1936 |